United States Patent
Maes et al.

(10) Patent No.: US 11,126,481 B2
(45) Date of Patent: Sep. 21, 2021

(54) FULFILLING A REQUEST BASED ON CATALOG AGGREGATION AND ORCHESTRATED EXECUTION OF AN END-TO-END PROCESS

(71) Applicant: ENTIT SOFTWARE LLC, Sunnyvale, CA (US)

(72) Inventors: Stephane Herman Maes, Fremont, CA (US); Lars Rossen, Palo Alto, CA (US); Woong Joseph Kim, Milford, CT (US); Keith Kuchler, Ft. Collins, CO (US); Jan Vana, Trebon (CZ); Ankit Ashok Desai, Santa Clara, CA (US); Christopher William Johnson, Evergreen, CO (US); Michael Yang, Leonia, NJ (US); Roy Ritthaler, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 1880 days.

(21) Appl. No.: 14/563,552

(22) Filed: Dec. 8, 2014

(65) Prior Publication Data

US 2015/0161681 A1   Jun. 11, 2015

Related U.S. Application Data

(60) Provisional application No. 61/913,799, filed on Dec. 9, 2013.

(51) Int. Cl.
*G06F 9/54* (2006.01)
*G06Q 30/02* (2012.01)
*H04L 12/58* (2006.01)

(52) U.S. Cl.
CPC .............. *G06F 9/546* (2013.01); *G06F 9/541* (2013.01); *G06F 9/542* (2013.01); *G06Q 30/0276* (2013.01); *H04L 51/046* (2013.01)

(58) Field of Classification Search
CPC ..... G06Q 30/0276; G06F 9/546; G06F 9/541; G06F 9/542; H04L 51/946
(Continued)

(56) References Cited

U.S. PATENT DOCUMENTS 9,015,324 B2   4/2015 Jackson
9,229,795 B2   1/2016 Maes
(Continued)

OTHER PUBLICATIONS

N. P. Georgantis, D. A. Koutsomitropoulos, P. A. Zafiris and T. S. Papatheodorou, A Review and Evaluation of Platforms and Tools for Building E-Catalogs, Jan. 10, 2002, Proceedings of the 35th Annual Hawaii International Conference on System Sciences, pp. 2440-2449. (Year: 2002).*
(Continued)

*Primary Examiner* — Jason B Dunham
*Assistant Examiner* — Brittany E Bargeon

(57) ABSTRACT

Catalogs that describe respective offerings for fulfillment by respective applications, are aggregated to form an aggregate catalog. A request relating to at least one of the offerings is received based on content presented from the aggregate catalog. In response to the request, an orchestrated execution of an end-to-end process is performed to fulfill the request relating to the at least one offering, the executing of the end-to-end process comprising calling at least one of the applications.

18 Claims, 6 Drawing Sheets

(58) Field of Classification Search
USPC .................................................. 705/26.44
See application file for complete search history.

(56) References Cited

U.S. PATENT DOCUMENTS

| | | | |
|---|---|---|---|
| 9,274,811 B1 | 3/2016 | Reeves | |
| 9,311,171 B1 | 4/2016 | Maes | |
| 9,658,868 B2 | 5/2017 | Hill | |
| 10,185,985 B1* | 1/2019 | Kapila | G06Q 30/0637 |
| 2002/0147656 A1* | 10/2002 | Tam | G06Q 30/02 |
| | | | 705/26.41 |
| 2002/0147858 A1 | 10/2002 | Motoyama et al. | |
| 2002/0184101 A1* | 12/2002 | Gidadhubli | G06Q 30/06 |
| | | | 705/26.1 |
| 2004/0143600 A1* | 7/2004 | Musgrove | G06Q 20/04 |
| 2005/0010458 A1 | 1/2005 | Holloway et al. | |
| 2006/0143350 A1 | 6/2006 | Miloushev | |
| 2006/0178893 A1 | 8/2006 | McCallie et al. | |
| 2007/0074225 A1 | 3/2007 | Viertola et al. | |
| 2008/0005155 A1 | 1/2008 | Soma et al. | |
| 2008/0133646 A1 | 6/2008 | Azulai | |
| 2008/0177879 A1 | 7/2008 | Krishnan et al. | |
| 2008/0235366 A1 | 9/2008 | Telfer et al. | |
| 2009/0044201 A1 | 2/2009 | Lee | |
| 2009/0158242 A1 | 6/2009 | Sifter et al. | |
| 2009/0217311 A1 | 8/2009 | Kocyan et al. | |
| 2010/0027552 A1 | 2/2010 | Hill | |
| 2010/0125624 A1 | 5/2010 | Bachhuber-Haller et al. | |
| 2011/0125823 A1 | 5/2011 | Macken | |
| 2011/0145326 A1 | 6/2011 | Lee et al. | |
| 2011/0179162 A1 | 7/2011 | Mayo et al. | |
| 2011/0231899 A1 | 9/2011 | Pulier | |
| 2011/0238458 A1* | 9/2011 | Purcell | G06F 9/5072 |
| | | | 705/7.27 |
| 2011/0258083 A1* | 10/2011 | Ren | G06Q 30/0641 |
| | | | 705/27.1 |
| 2011/0296391 A1 | 12/2011 | Gass et al. | |
| 2011/0314165 A1 | 12/2011 | Maes et al. | |
| 2012/0011067 A1 | 1/2012 | Katzin | |
| 2012/0030689 A1 | 2/2012 | Li et al. | |
| 2012/0078731 A1* | 3/2012 | Linevsky | G06Q 30/0603 |
| | | | 705/14.73 |
| 2012/0137307 A1 | 5/2012 | Sarferaz | |
| 2012/0158821 A1 | 6/2012 | Barros | |
| 2012/0185913 A1 | 7/2012 | Martinez | |
| 2012/0246287 A1 | 9/2012 | Malloy et al. | |
| 2013/0024567 A1 | 1/2013 | Roxburgh et al. | |
| 2013/0041707 A1 | 2/2013 | Bose et al. | |
| 2013/0166703 A1 | 6/2013 | Hammer | |
| 2013/0232480 A1 | 9/2013 | Winterfeldt | |
| 2013/0232497 A1 | 9/2013 | Jalagam | |
| 2013/0232498 A1 | 9/2013 | Mangtani | |
| 2013/0254376 A1 | 9/2013 | Kudikala et al. | |
| 2013/0291121 A1 | 10/2013 | Iovanov | |
| 2013/0312012 A1 | 11/2013 | Bovich et al. | |
| 2014/0006482 A1 | 1/2014 | Raghu | |
| 2014/0006580 A1 | 1/2014 | Raghu | |
| 2014/0006581 A1 | 1/2014 | Raghu | |
| 2014/0059226 A1 | 2/2014 | Messerli et al. | |
| 2014/0075034 A1 | 3/2014 | Vasudevan et al. | |
| 2014/0082131 A1 | 3/2014 | Jagtap | |
| 2014/0082156 A1 | 3/2014 | Jagtap | |
| 2014/0108645 A1 | 4/2014 | Falco et al. | |
| 2014/0108665 A1 | 4/2014 | Arora | |
| 2014/0109115 A1 | 4/2014 | Low | |
| 2014/0129698 A1 | 5/2014 | Seago et al. | |
| 2014/0136680 A1 | 5/2014 | Joshi et al. | |
| 2016/0072727 A1 | 3/2016 | Leafe et al. | |
| 2016/0253722 A1* | 9/2016 | Johnson | G06Q 30/0603 |
| | | | 705/26.1 |
| 2017/0180324 A1 | 6/2017 | Hill | |

OTHER PUBLICATIONS freemarker.org—Freemarker—Overview, Oct. 2014 (2 pages).
Hewlett-Packard Development Company, L.P., International Appl. No. PCT/US2013/067870 entitled Aggregating, Presenting, and Fulfilling a Number of Catalogs filed Oct. 31, 2013 (31 pages).
Hewlett-Packard, Universal Data Model (UDM) Overview dated on or before Nov. 2014 (1 page).
Maes et al., U.S. Appl. No. 14/563,327 entitled Execution of End-to-End Processes Across Applications filed Dec. 8, 2014 (37 pages).
Maes et al., U.S. Appl. No. 14/563,331 entitled Execution of a Workflow That Involves Applications or Services of Data Centers filed Dec. 8, 2014 (43 pages).
Martin Fowler, Microservices, Mar. 25, 2014 (16 pages).
opengroup.org—IT4IT FAQ—The Open Group Blog, Feb. 2-5, 2015 (3 pages).
Srikanth et al., IBM, DeveloperWorks, Schools Interoperability Framework and SOA—An interoperability bridge, Mar. 15, 2011 (14 pages).
Wikipedia, RabbitMQ dated on or before Nov. 2014 (4 pages).
www.mulesoft.com—Understanding Enterprise Application Integration—The Benefits of ESB for EAI dated on or before Nov. 2014 (6 pages).
U.S. Appl. No. 14/563,327, Non-Final Rejection dated May 22, 2015, pp. 1-4 and attachments.
U.S. Appl. No. 14/563,327, Notice of Allowance dated Sep. 14, 2015 (8 pages).
U.S. Appl. No. 14/563,331, Final Rejection dated Dec. 1, 2016, pp. 1-42 and attachments.
U.S. Appl. No. 14/563,331, Final Rejection dated Dec. 27, 2017, pp. 1-27 and attachment.
U.S. Appl. No. 14/563,331, Final Rejection dated Feb. 21, 2019, pp. 1-62 and attachments.
U.S. Appl. No. 14/563,331, Non-Final Rejection dated Aug. 6, 2018, pp. 1-61 and attachments.
U.S. Appl. No. 14/563,331, Non-Final Rejection dated Jul. 11, 2017, pp. 1-47 and attachments.
U.S. Appl. No. 14/563,331, Non-Final Rejection dated Jun. 28, 2016, pp. 1-36 and attachments.
U.S. Appl. No. 14/958,617, Notice of Allowance dated Jan. 6, 2016, pp. 1-4 and attachments.

* cited by examiner

FULFILLING A REQUEST BASED ON CATALOG AGGREGATION AND ORCHESTRATED EXECUTION OF AN END-TO-END PROCESS

CROSS-REFERENCE TO RELATED APPLICATION

This application claims the benefit under 35 U.S.C. §119(e) of U.S. Provisional Application No. 61/913,799, filed Dec. 9, 2013, which is hereby incorporated by reference.

BACKGROUND

An enterprise may offer various services, which can be implemented with applications. Examples of services include services relating to information technology (IT) management, such as management of development and production to program code, management of a portfolio of products or services, support management, IT service management, and so forth. Users can use various portals to request the services.

BRIEF DESCRIPTION OF THE DRAWINGS

Some implementations are described with respect to the following figures.

DETAILED DESCRIPTION

Figure 1:
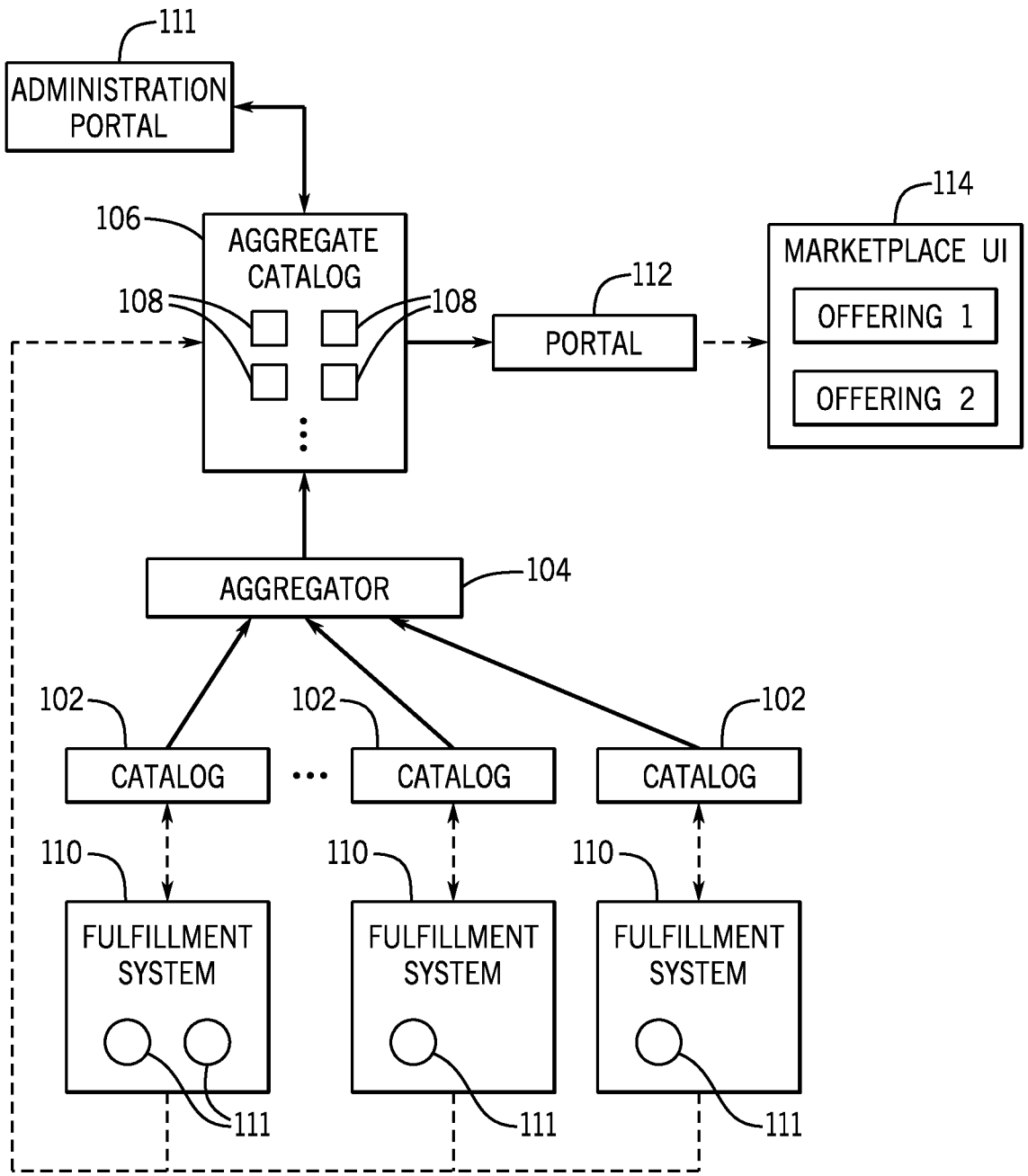
FIG. 1 is a schematic diagram of an example arrangement including an aggregator to aggregate catalogs to form an aggregate catalog, according to some implementations.

An enterprise can offer various services, which can services for information technology (IT) management as well as other types of services. An "enterprise" can refer to a business concern, an educational organization, a government agency, an individual, or any other entity.

Applications can be associated with respective catalogs. An "application" can refer to machine-readable instructions (such as software and/or firmware) that are executable. An application can be an application developed by the enterprise, or an application provided by an external vendor of the enterprise. An application can be provided on the premises of the enterprise, or in the cloud, and the application can be a hosted application (e.g. an application provided by a provider over a network), a managed service (a service provided by a service provider), or a software as a service (SaaS) (a service available on a subscription basis to users), and so forth. SaaS can refer to an arrangement in which software (or more generally, machine-executable instructions) is made available to users on a subscription basis. The applications can be from different vendors. In some cases, multiple applications used by the enterprise may be provided by different vendors.

A catalog can include catalog items, where each catalog item can include a collection of information that describes characteristics of a respective service (or services), as well as other metadata related to the offering(s). The catalog can have a predetermined format, and can include one or multiple documents that contain the corresponding information relating to the offering(s). The information describing characteristics of an offering in a catalog can describe features of the offering. Offerings can include services, products (e.g. machines, devices, program code, etc.), procurement orders, and so forth, which can be offered by the enterprise. An offering can also include service such as a support request (a request from a customer for support relating to a service or product).

A catalog can include other metadata such as at least one or some combination of the following information: access control information that specifies entities with permission to access the catalog, such as an identity of customers or a class of customers or other entities who are permitted to see and perform actions such as ordering or managing offering(s) of the catalog (access control information can also specify role-based access rights, and the access control information can be global across all offerings or specific to some offerings or classes of offerings), commercial terms of the offering(s) (such as the price or cost of an offering, options of the offering, as well as other terms), constraints relating to the offering(s), and other metadata. Constraints can include one or more of the following: approval constraints that specify an approval procedure to use for approving a request for an offering(s), and the identification of an entity or entities to perform the approval; constraints that specify visibility of the offering(s) (to identify entities such as users who can view the offering(s)); constraints that identify applications to be invoked; constraints relating to fulfillment of a request for the offering(s); and other types of constraints. The price can be a non-zero or zero value, and in some examples, the price can be related to an accounting operation of an enterprise. The metadata of the catalog can also specify information regarding how the offering(s) of the catalog is to be presented in a portal (that presents a user interface)—the user interface presented by the portal is how customers can view the offering(s). In addition, the metadata can include one or more of the following: information about an interface, such as an application programming interface (API) relating to the offering(s), information about how to manage the offering(s), information about what to display in a graphical user interface (GUI). For an aggregate catalog (discussed further below), the metadata can also identify the source(s) of the content of individual catalogs that have been aggregated to form the aggregate catalog.

An enterprise may traditionally maintain multiple applications with catalogs and hence multiple catalogs for respective different applications. These different catalogs can be associated with respective different portals (which can present respective user interfaces through which customers can search or browse respective catalogs, order offerings, and then manage the orders). As a result, users may have to access respective different portals to view the corresponding offerings. Having to access different portals for different offerings can be inconvenient to users. Also, the different portals can be challenging to maintain, administer, and so forth. To avoid catalog and portal sprawl, enterprises or service providers with multiple catalogs want to be able to use a common portal and catalog across multiple applications so that customers can go to a single place.

As shown in FIG. 1, in accordance with some implementations, multiple catalogs 102 associated with different applications are aggregated by an aggregator 104 into an aggregate catalog 106. The aggregator 104 can be implemented as a combination of machine-executable instructions and processing hardware (e.g. computer(s), processor(s), etc.). Alternatively, the aggregator 104 can be implemented with just processing hardware.

The aggregate catalog 106 includes portions 108 that contain respective content of the catalogs 102. As further shown in FIG. 1, each catalog 102 is associated with a respective fulfillment system 110, where a fulfillment system can include one or multiple applications 111 that can be invoked to perform the service(s) of the corresponding catalog 102 (or more generally to fulfill a request for an offering of the catalog).

Aggregating the catalogs 102 into the aggregate catalog 106 can involve combining the content of the individual catalogs 102 into the aggregate catalog 106. In addition, the aggregation performed by the aggregator 104 also establishes synchronization links between the individual catalogs 102 and the aggregate catalog 106. The synchronization links allow for synchronization of the content of the individual catalogs 102 and the aggregate catalog 106, such that any update of an individual catalog 102 is automatically reflected to the aggregate catalog 106, and similarly any update of the aggregate catalog 106 is reflected to the corresponding individual catalog (or individual catalogs) 102.

In some examples, the individual catalogs 102 and the aggregate catalog 106 may be synchronized using an aggregation application programming interface (API). For example, when a new offering is created or an existing offering is updated in an individual catalog 102, the new or updated offering may be aggregated and presented in the aggregate catalog 106 through the aggregation API. In some examples, although the individual catalogs may be according to different models, alignment of terminology and models may occur in the implementation of the aggregation API. The aggregation API can include routines that are invoked to perform the synchronization (the synchronization can be performed periodically or can be triggered by changes). Moreover, the aggregation API can include routines to perform aggregation of an individual catalog into the aggregate catalog 106. As an example, a POST routine of an aggregation API associated with an individual catalog 102 can be used to provide the content of the individual catalog to the aggregate catalog 106. Similarly, the aggregation API associated with the aggregate catalog 106 can invoke a GET routine to retrieve content from an individual catalog 102. The aggregator 104 can include the aggregation APIs. In other implementations, the aggregator 104 can be implemented with a different aggregation mechanism.

In accordance with some implementations, fulfillment of the services (or more generally offerings) associated with the aggregate catalog 106 can be performed by the existing (un-modified) fulfillment systems 110 associated with the respective individual catalogs 102. In other words, to implement a service of the aggregate catalog 106, an existing fulfillment engine or engines 110 (or more specifically, the existing applications 111 of the fulfillment engines 110) can be employed, such that the fulfillment engines 110 (or applications 111) do not have to be modified to support the services of the aggregate catalog 106.

FIG. 1 also depicts an administration portal 111 to manage the offerings in the aggregated catalog 106, and to manage access by users of the aggregate catalog 106. The administration portal 111 can be implemented with a combination of machine-executable instructions and processing hardware, or with just processing hardware.

The aggregator 104 (or another entity) can bundle offerings of selected individual catalogs 102 to form a bundle of offerings, which can be presented to customers as a bundle. A bundle including offerings that span multiple catalogs can be created using the administration portal 111. An administrator can use the administration portal 111 to create the bundle and the associated metadata. Note that a bundle that is within an individual catalog can simply be reflected from that individual catalog to the aggregate catalog 106 during the aggregation by the aggregator 104.

In addition, the aggregator 104 (or another entity, such as the administration portal 111) can create new offerings or set new commercial terms (e.g. new price) based on one or multiple offerings of the individual catalogs 102. The new offerings (or new terms) can also be presented to customers. The bundled or new offerings can be associated with multiple applications to use for fulfillment.

As further shown in FIG. 1, a common portal 112 can be used to present the offerings associated with the aggregate catalog 106, where the offerings can be the original offerings of the individual catalogs 102, bundles of offerings, or new offerings. In addition, with the portal 112, a customer can order an offering from the aggregate catalog 112, and then manage the lifecycle of the order, such as to change or cancel the order, to see status of the order, to update the order, and so forth.

The portal 112 can be implemented with a combination of machine-executable instructions and processing hardware, or just processing hardware. The portal 112 is able to present a marketplace user interface (UI) 114. The marketplace UI presents various information relating to various offerings (e.g. offering 1 and offering 2 shown in the example of FIG. 1) that are based on the aggregate catalog 106. The information presented in the marketplace UI 114 is based on content (information) in the aggregate catalog 106. In this way, a one-stop shopping experience can be provided to customers who wish to access the various offerings provided by an enterprise. By using the common portal 112 according to some implementations, the offerings of the enterprise are easy to find. In addition, the offerings presented by the portal 112 can be up-to-date, and can reflect changes made to individual catalogs 102 as well as to the aggregate catalog 106.

The marketplace UI 114 can be presented on various client devices used by customers. Such client devices can include desktop computers, notebook computers, tablet computers, smartphones, and so forth.

Figure 2A:
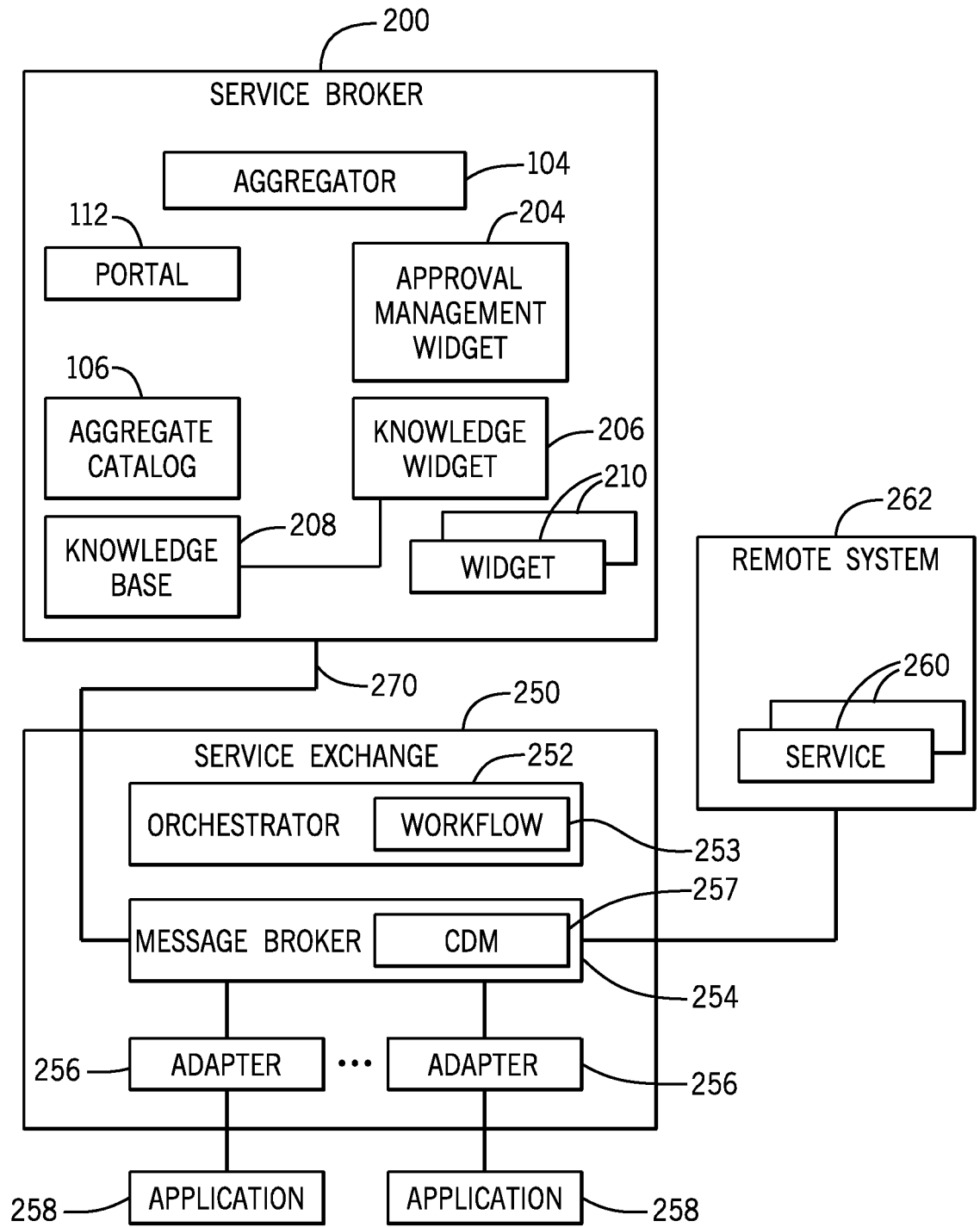
FIG. 2A is a block diagram of an example arrangement that includes a service broker and a service exchange, according to some implementations.

FIG. 2A depicts an example arrangement that includes a service broker 200 and a service exchange 250. If the offerings of the aggregate catalog 206 relate to information technology (IT) management, then the service broker 200 can be referred to as an IT service broker. IT management can include cloud-based IT management, IT management using Software as a Service (SaaS) services, and so forth. In these latter cases, the IT service broker can refer to a cloud service broker or a SaaS service broker.

According to one deployment model, the service broker 200 and/or the service exchange 250 can be provided at the premises of an enterprise. In other deployment models, the service broker 200 and/or the service exchange 250 can be deployed in the cloud and/or other data centers. The components of the service broker and/or the service exchange 250 can be implemented as SaaS services. If implemented in the cloud, the cloud can be public cloud, a private (virtual) cloud, or a hosted cloud. A cloud can also be a managed cloud. In addition, a hybrid approach can be used, in which aggregation of catalog can be performed on premises of the enterprise, and aggregation of catalogs can also be performed in the cloud—the catalog aggregations can in turn be aggregated.

The service broker 200 includes the aggregator 104, the aggregate catalog 106, the portal 106, and other components (discussed further below). Generally, the service broker 200 provides a front-end, in the form of the portal 106, to allow customers to find offerings of the enterprise. In addition, the service broker 200 provides the aggregate catalog 106 to allow for one-stop shopping of the offerings. The service broker 200 can also have other capabilities, discussed further below.

The service broker 200 is able to collect offerings of disparate systems that are associated with respective different catalogs 102. Some of the disparate systems can include systems of third party vendors of the enterprise.

The service broker 200 is coupled to a service exchange 250 that includes an orchestrator 252, a message broker 254, and adapters 256. The service exchange 250 is able to peform an orchestrated execution of an end-to-end process (also referred to as a workflow) in response to a request for an offering made through the portal 112 based on the aggregate catalog 106. An "end-to-end process" refers to a process that includes a number of activities of the enterprise from start to finish. The orchestrated execution of the end-to-end process involves delegation of tasks to applications 258 and/or to services 260 (e.g. SaaS service, etc.) of a remote system 262 (e.g. cloud system, etc.).

Delegation of fulfillment of an order of an offering can be delegated to respective applications. The applications 258 and the services 260 can be the applications (and services) that are part of the fulfillment systems 110 of FIG. 1. The service exchange 250 and its components are discussed in further detail below.

The service broker 200 can be deployed at a customer site, can be deployed with SaaS services, or can be deployed at a platform of the enterprise.

A customer can make a selection of at least one offering in the marketplace UI 114 presented by the portal 112. In response to selection of the at least one offering, the portal 112 sends information regarding such selected offering(s) to the service exchange 250, to trigger performance of the end-to-end process relating to the selection of the at least one offering.

The service broker 200 can also include various widgets that are developed to perform respective functions. A widget can be implemented with program code (machine-executable instructions). For example, the widgets can include an approval management widget 204 and a knowledge widget 206. The approval management widget 204 can perform an approval procedure based on the approval constraints metadata contained in the aggregate catalog 106 for requested offering(s). In some examples, the approval management widget 204 can be called via an API by an approval process. The approval constraints metadata can be copied from or derived from the approval constraints metadata of the individual catalogs 102.

The approval management widget 204 can be invoked to determine whether an order for an offering or bundle of offerings can be approved. The approval management widget 204 can also determine, based on the approval constraints metadata, the entity (or entities) that are to be contacted to obtain the approval. Such entity or entities can be users, machines, or program code. Different approval implementation processes can be provided. In some examples, approval evaluation can be delegated by the approval management widget 204 to applications. In other examples, the approval management widget 204 can externalize the approval processes (externalized from the applications), and can implement itself the approval processes. The externalization can be performed by using APIs to call the respective applications to perform synchronization (initial synchronization and subsequent synchronization) of approval processes used by the applications and the approval management widget 204. In other examples, instead of performing synchronization, the approval management widget 204 can make a request to a respective application for information of the approval process whenever the approval process is to be performed.

The service broker 200 can also include a knowledge widget 206 that manages a knowledge base 208. The knowledge base 208 can be searched by the knowledge widget 206 to obtain information about various offerings associated with the aggregate catalog 106. The knowledge base 208 can contain information from various documents (e.g. articles, specifications, etc.) that describe the various offerings associated with the aggregate catalog 106. The information from such documents can be extracted and included in the knowledge base 208, against which a customer can perform a search using the knowledge widget 206. Note that the documents describing the respective offerings can be associated with the applications for the individual catalogs 102. Instead of having to make an inquiry to each respective application in response to a search for information, the knowledge widget 206 can instead externalize the information of such documents associated with the applications, and store such information in the knowledge base 208.

In alternative implementations, the knowledge widget 206 can make an inquiry to a specific application 111 in response to an information search about an offering.

The service broker 200 can also include other widgets 210, for providing other capabilities. As further examples, one of the widgets 210 can perform subscription lifecycle management of an order for an offering(s). Lifecycle management of subscriptions or orders can refer to the ability of a user (who ordered an offering) or an administrator to manage the next steps of an order. Consider the following examples. If a user orders an item, the user may want to know the status of the order. This can be done by using a confirmation number for the order, and the confirmation number can be used to track when the item has shipped, for example. Also, the confirmation number can be used to cancel the order or return the item for possible subsequent re-ordering.

For a system such as cloud service automation (CSA), a user can order cloud services, such as infrastructure services (or Infrastructure as a Service (IaaS)), Platform as a Service (PaaS), SaaS, and cloud applications. In such an example, lifecycle management can include a user cancelling the order, duplicating the order, move the order, monitoring the order, remediating issues associated with the order, and so forth.

Another of the widgets 210 can perform support ticket management. A system such as a service manager or a ticket support system can be modeled as a catalog. Selecting an item of such catalog amounts to selecting a particular category of support request. Filling a form detailing the issue is akin to selecting options for the offering. Submitting the ticket is akin to requesting fulfillment and obtaining an order confirmation number. Upon completion of the submission, a reference to the ticket is returned, where this reference is to the order confirmation number.

Various products, such as a service manager or other products, can provide a self-service portal and catalogs to order information technology (IT) items such as handheld devices (e.g. smartphones, digital personal assistants), notebook computers, and so forth. The self-service portal can also be used to report problems with ordered items or other IT services. As another example, a user may request a badge or an employee number. In the foregoing examples, the user can create a ticket for the user's subscription (the service the user has ordered or uses, either explicitly or implicitly).

A lifecycle management of the ticket is the ability by the user to then view the status of the ticket (e.g. what is recommended to try or do), close the ticket (e.g. if the ticket is resolved), update the ticket (e.g. to provide more information), or respond to questions that are asked by support personnel.

Similarly, as another example, an administrator can also manage an order or manage a cloud service ordered by a user. Support personnel can also manage the lifecycle of the ticket, update the ticket to respond to an issue, or close the ticket. Another example of ticket management can include incident case management.

Other example widgets 210 can include a widget to select or fill information for a service. For example, a widget can be used to select options of a virtual machine, or to use tools for filling a ticker based on fields to select in forms. An offering in the aggregate catalog 106 can indicate that an order is to be customized, and the widget can either use the metadata in the aggregate catalog 106 associated with the offering or call the involved fulfilling application, to extract the information that is to be filled. The widget can also offer an editor that understands how to use and preset the information to perform form-filling for the user. The extraction can be done periodically (once initially and then synchronization can be performed for changes from applications when they take place), or the extraction can be delegated to applications.

In further examples, one of the widgets 210 can be used to determine access visibility of offerings associated with the aggregate catalog 106. The widget 210 can determine customers (or classes of customers) or other entities who have permission to view selected offerings (or bundles of offerings). The customers (or classes of customers) or other entities who have permission to view offerings can be based on information included in the individual catalogs 102. However, for bundled offerings or new offerings, the widget 210 can determine a different set of customers (or classes of customers) or other entities who are permitted to view the bundled or new offerings.

The widgets 204, 206, and 210 of the service broker 200 constitute examples of microservices. A microservice can refer to a Service Oriented Architecture (SOA) service (implemented with program code) that executes a specific function and exposes a functional interface to execute or call the SOA service. The microservice can also include an API, and an interface to the service exchange 250 to interact with backend services or applications. The microservice can also provide a widget UI that allows user interaction. In response to user interaction with the widget UI, the service exchange 250 can be used to interact with backend services or applications that are to be involved in implementing a service. In other examples, the widgets can be implemented with other types of code.

The service broker 200 can also include another microservice (not shown) that can interact with the service exchange 250 over an interface 270. The interface 270 can include an application programming interface (API), such as a Representational State Transfer (REST) API or another type of API.

Figure 2B:
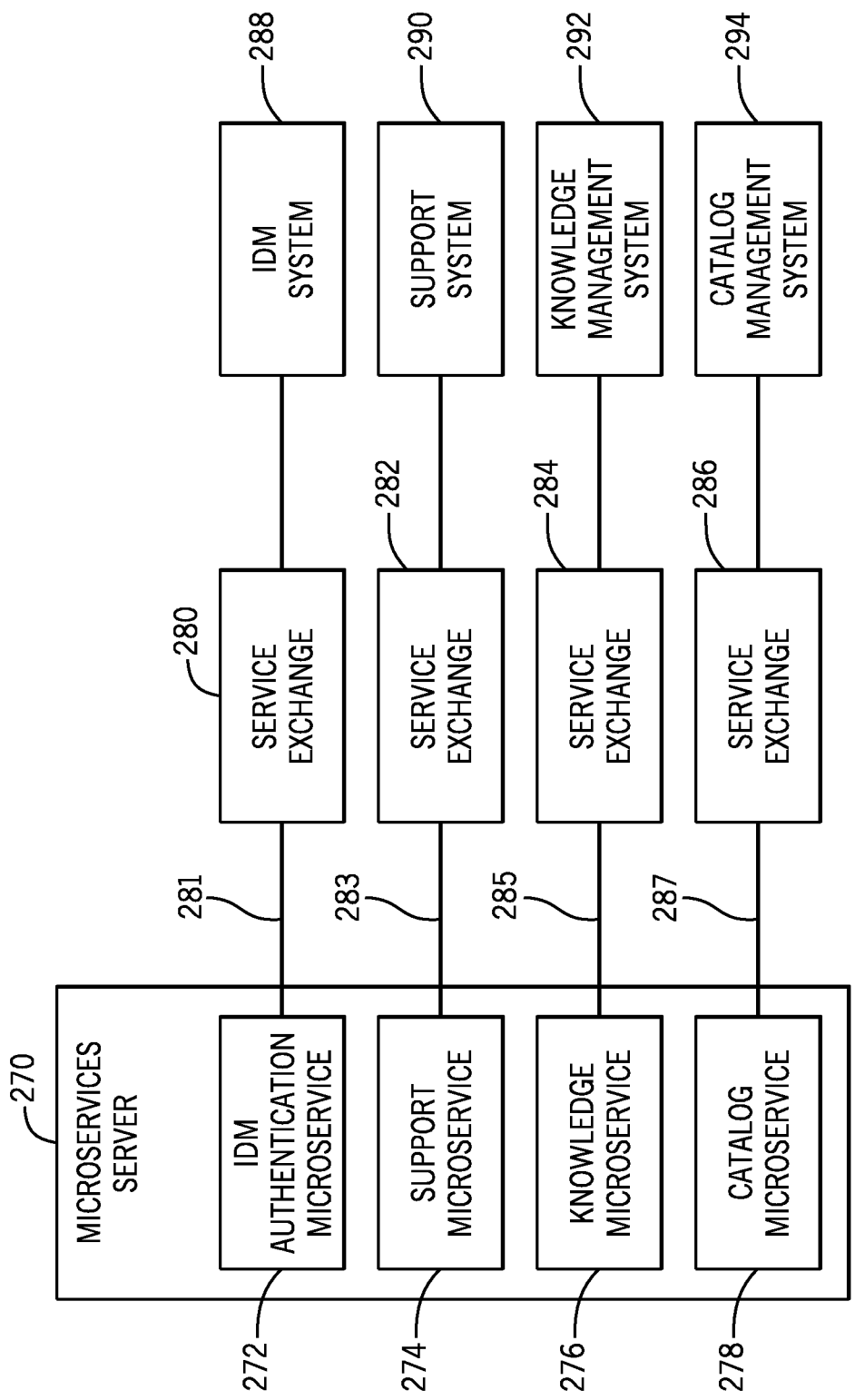
FIG. 2B is a block diagram of an example arrangement that includes a microservices server, service exchanges, and backend systems, according to further implementations.

FIG. 2B illustrates an example arrangement according to further implementation. The arrangement of FIG. 2B includes a microservices server 270, which can be an example implementation of a portion of the service broker 200. The microservices server 270 includes various microservices (as explained above), including an identity management authentication microservice 272, a support microservice 274, a knowledge microservice 276, and a catalog microservice 278. Although example microservices are shown in FIG. 2B, it is noted that other or alternative microservices can be provided in the microservices server 270, including those shown in FIG. 2A.

The identity management authentication microservice 272 is to initiate the performance of authentication for a respective service. The support microservice 274 is to perform various support tasks. The knowledge microservice 276 is to manage a knowledge base. The catalog microservice 278 is to perform a service related to the aggregate catalog 106, such as to perform aggregation of individual catalogs 102 into the aggregate catalog 106.

The microservices 272, 274, 276, and 278 can send respective requests over corresponding APIs 281, 283, 285, and 287 to respective service exchanges 280, 282, 284, and 286, which can be configured in similar manner as the service exchange 250 of FIG. 2A. Although multiple service exchanges are shown in FIG. 2B for corresponding microservices, it is noted that in other examples, multiple microservices can share a service exchange. Each service exchange 280, 282, 284, and 286 can orchestrate execution of respective workflows using respective backend systems 288, 290, 292, and 294, which can include the identity management system 288, the support system 290, the knowledge management system 292, and the catalog management system 294. Each of the systems 288, 290, 292, and 294 can include respective applications or services.

The service broker thus provides an agile platform to develop or provide microservices, such that a new agile and reusable programming model is provided that can be considered as an evolution of the SOA. Also, tools can be provided to author the microservices and the applications using the microservices.

Figure 2C:
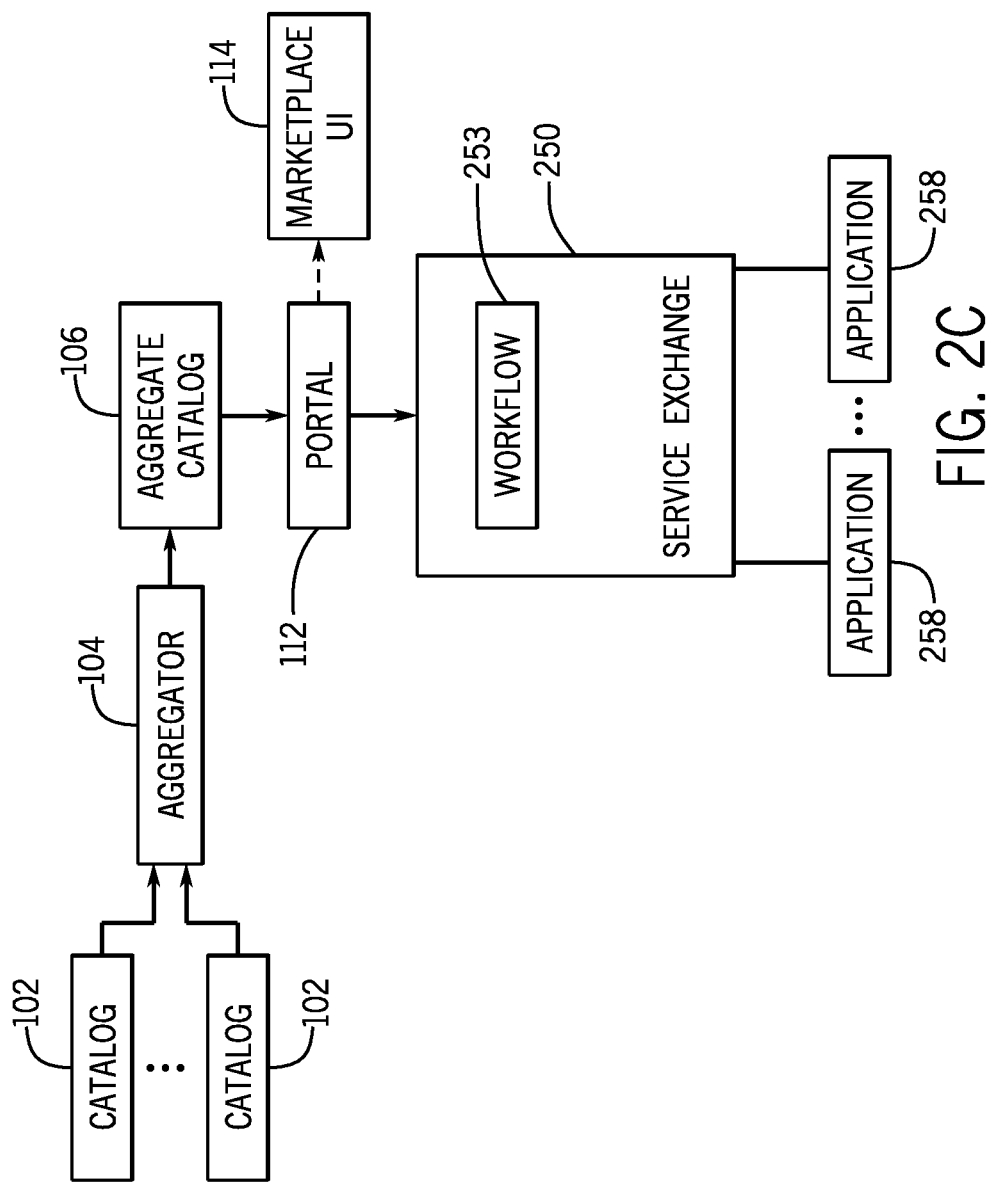
FIG. 2C is a block diagram of another example arrangement that includes an aggregator, a portal, and a service exchange, according to some implementations.

A simplified view of an arrangement of selected components from FIGS. 1 and 2 is shown in FIG. 2C. The aggregator 104 aggregates catalogs 102 to form an aggregate catalog 106. The portal 112 uses information in the aggregate catalog 106 to present information relating to offerings in the marketplace UI 114.

The service exchange 250 triggers execution of the workflow 253 responsive to a selection of at least one of the offerings in the marketplace UI 114, where the service exchange 250 delegates tasks to applications 258 as part of the workflow, the applications including applications associated with the individual catalogs 102.

In other implementations, fulfillment of a request for an offering can use triggers in the aggregate catalog 106. For example, the portal 112 can call an API of the aggregate catalog 106 to fulfill a request for an offering. This call is passed to the service exchange 250.

Figure 3A:
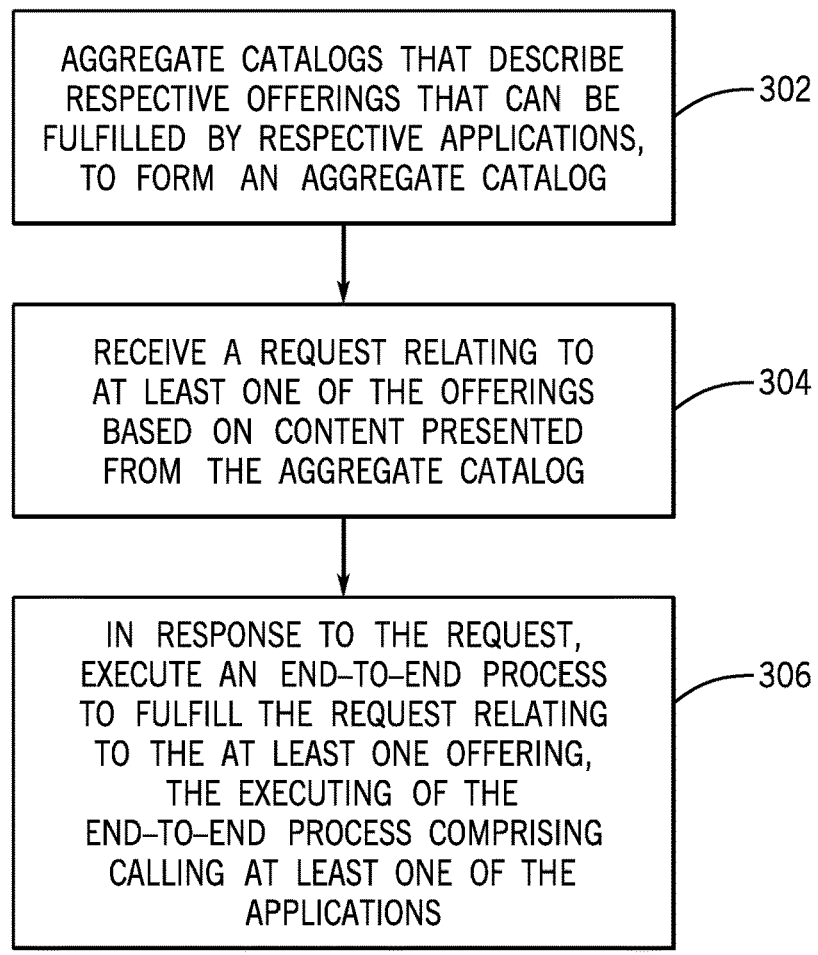
FIGS. 3A and 3B are flow diagrams of processes according to some implementations.

FIG. 3A is a flow diagram of a process according to some implementations, which can be performed by various components of a system as depicted in FIG. 2A, for example.

Catalogs (e.g. the individual catalogs 102) that describe respective offerings are aggregated (at 302) to form an aggregate catalog (e.g. aggregate catalog 106). The offerings of the catalogs are fulfilled using respective applications (e.g. 111 in FIG. 3). Fulfilling an offering using an application can refer to performing a service (if the offering is a service) using the application, or satisfying a requested action with respect to a product (if the offering is a product). The aggregating can be performed by the aggregator 104. The system (and more specifically, the portal 112) receives (at 304) a request relating to selection of at least one of the offerings based on content presented from the aggregate catalog. As an example, such content presented from the aggregate catalog can be made in the marketplace UI 114 shown in FIG. 1.

In response to the request, the system (and more specifically the service exchange 250) executes (at 306) an end-to-end process to fulfill the request for the selected at least one offering, where executing of the end-to-end process involves calling at least one of the applications associated with the individual catalogs.

Figure 3B:
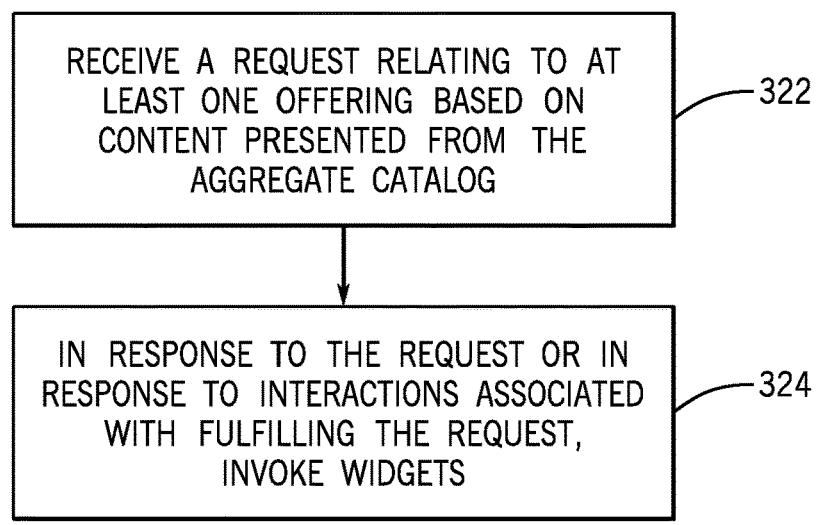

FIG. 3B is a flow diagram of a process according to further implementations, which can be performed by various components of a system as depicted in FIG. 2A, for example. The system (and more specifically, the portal 112) receives (at 322) a request relating to selection of at least one offering based on content presented from the aggregate catalog. As an example, such content presented from the aggregate catalog can be made in the marketplace UI 114 shown in FIG. 1.

In response to the request or in response to interactions during fulfillment of the request, the system can invoke (at 324) various widgets, including any or some combination of the following: the approval management widget 204, knowledge 206, lifecycle management widget, support ticket management widget, widget to select or fill information, widget to determine access visibility, a widget to create or new offering or a new term of an existing offering, or other widgets. These widgets are discussed further above.

The following provides a further discussion of the components of the service exchange 250 in FIG. 2A, which includes the orchestrator 252, a message broker 254, and adapters 256. The adapters 256 are provided between the message broker 254 and the respective applications 258. The orchestrator 252, message broker 252, and adapters 256 are part of the service exchange platform. Content can be loaded onto the platform, where the content includes flow logic to implement workflows (e.g. 253) that correspond to enterprise processes or use cases, and the applications. As discussed further below, such content can be changed.

Each of the orchestrator 252, message broker 254, and adapters 256 can be implemented as a combination of machine-executable instructions and processing hardware. In other examples, any of the orchestrator 252, message broker 254, and adapters 256 can be implemented with just processing hardware.

The orchestrator 252 is used to orchestrate the execution of a specific workflow 253 that involves tasks performed by multiple applications 258. To perform a workflow, flow logic can be loaded into the orchestrator 252, and the flow logic is executed by the orchestrator 252. "Flow logic" can include a representation of a collection of tasks that are to be performed. The flow logic can be in the form of program code (e.g. a script or other form of machine-executable instructions), a document according to a specified language or structure (e.g. Business Process Execution Language (BPEL), a Business Process Model and Notation (BPMN), etc.), or any other type of representation (e.g. Operations Orchestration from Hewlett-Packard, YAML Ain't Markup Language (YAML), Mistral from OpenStack, etc.). The flow logic can be generated by a human, a machine, or program code, and can be stored in a machine-readable or computer-readable storage medium accessible by the orchestrator 252.

The orchestrator 252 is able to execute multiple flow logic to perform respective workflows. Multiple workflows and workflow instances (instances of a particular workflow refer to multiple instantiations of the particular workflow) can be concurrently executed in parallel by the orchestrator 252.

The orchestrator 252 is able to evaluate (interpret or execute) a flow logic, and perform tasks specified by the flow logic in response to a current state of the workflow and calls and events received by the orchestrator 252. A workflow can be a stateful workflow. As a stateful workflow is performed by the orchestrator 252, the orchestrator 252 is able to store a current state of the workflow, to indicate the portion of the workflow already executed. Based on the workflow's current state and a received event, the orchestrator 252 is able to transition from a current state to a next state of the workflow and can determine a next action to perform, where the next action may involve the invocation of another application. Whenever the orchestrator 252 receives a new call or event (e.g. response, results, or other event), the orchestrator 252 evaluates which workflow instance is to receive the call or event and loads the workflow instance with a correct state. In some cases, it is possible that multiple workflow instances may check if they are supposed to be a recipient of a call or event.

In other examples, a workflow can be a stateless workflow, which does not keep track of a current state of the workflow. Rather, the stateless workflow performs corresponding next steps or actions as events are received by the orchestrator 252. Use of a stateless workflow is generally suitable for asynchronous operation (discussed further below). A stateful workflow can be used with both a synchronous operation and asynchronous operation.

The events (e.g. results, responses, etc.) received by the orchestrator 252 can be provided by applications that are invoked in the workflow or from another source, such as through the API 270 of the message broker 254. The message broker 254 can also direct an event to a particular workflow instance (note that there can be multiple workflow instances executing concurrently). If the workflow instance is a stateful workflow, then an event can be provided to a state of the workflow.

The message broker 254 is operatively or communicatively coupled to the orchestrator 252 and the adapters 256. Generally, the message broker 254 is used to exchange messages among components, including the orchestrator 252 and the adapters 256. A message can include any or some combination of the following: a call (e.g. API call) or an event (e.g. response, result, or other type of event). The message broker 254 is responsible for ensuring that API calls and events (e.g. responses, results, etc.) are sent to the correct adapter or to the correct workflow instance (multiple workflow instances may execute concurrently). Alternatively, the endpoints (adapters and workflow instances) may all receive a call or event and make a decision regarding whether each endpoint should process the call or event.

The message broker 254 can also have an interface 270, which can include an API. An external entity can communicate with the message broker 254 using the API 270, such as to trigger a workflow (enterprise process or use case) or make progress (or step through) the workflow. The API 270 of the message broker can also be used to communicate a status update of a workflow.

The message broker 254 can include queues for temporarily storing information to be forwarded target components, and can include information forwarding logic that is able to determine a destination of a unit of information based on identifiers and/or addresses contained in the unit of information.

In some examples, the message broker 254 can employ an Advanced Message Queuing Protocol (AMQP), which is an open standard application layer protocol for message-oriented middleware. AMPQ is described in a specification provided by the Organization for the Advancement of Structured Information Standards (OASIS). An example of a message broker that employs AMPQ is RabbitMQ, which is an open source message broker application.

In other examples, other types of message brokers that employ other messaging or information exchange protocols can be used.

The information exchanged using the message broker 254 can include information sent by the orchestrator 252, where the information sent by the orchestrator 252 can include applications calls and/or data. An "application call" can refer to a command (or commands) or any other type of message that is issued to cause an instance of a respective application to execute to perform a requested task (or tasks).

The information exchanged using the message broker 254 can also include information sent by the applications. For example, the information sent by an application can include response information that is responsive to a respective application call. The information sent by the applications can also include information sent autonomously by an application without a corresponding request from the orchestrator 252. Information from an application can be included in an event sent by the application, where an "event" can refer to a representation of a unit of information. The event can include a response, a result, or any other information. Note that an event from an application can be in response to a synchronous call or asynchronous call. A synchronous call to an application by the orchestrator 252 is performed for a synchronous operation. In a synchronous operation, a workflow waits for a response to be received before proceeding further (in other words, the workflow blocks on the response). An asynchronous operation of a workflow refers to an operation in which the workflow does not wait for a response from an application in response to a call to the application.

In other examples, an event from an application can be due to something else occurring at the application level (e.g. a support agent closes a ticket when using the application). Such an event can be sent to the workflow, such as the workflow for an incident case exchange use case (explained further below).

An event or call can also be received through the API 270 of the message broker 254 from another source.

The message broker 254 is able to respond to a call (such as an API call from the orchestrator 252 by making a corresponding call to the API of the respective instance of an application that is executing in a particular workflow instance. Adapters 256 may register with the message broker 254, and the message broker 254 can use the registration to determine how to direct a call, and how events (e.g. results, responses, etc.) are tagged or associated to a workflow instance. In some cases, it is possible that a message (a call or event) may be addressed to several workflow instances, in which case the message broker 254 can direct the message to the several workflow instances.

When performing a workflow based on flow logic executed by the orchestrator 252, the orchestrator 252 can issue application (synchronous or asynchronous) calls to the message broker 254 for invoking the applications at corresponding points in the workflow. A call can also be made by the orchestrator as part of throwing an event (which refers to the workflow deciding to communicate the event as a result of some specified thing occurring).

The flow logic for a respective workflow can be written abstractly using a canonical data model (CDM) 257. Although the canonical data model 257 is depicted as being inside the message broker 254, it is noted that the canonical data model 257 can be separate from the message broker 257 in other examples.

The canonical data model 257 can be used to express application calls to be issued by the orchestrator 252 to the message broker 254. The canonical data model 257 can also be used to express arguments (e.g. messages) for use in the calls, as well as the logic to be performed. The application calls can be abstract calls. The canonical data model 257 can be expressed in a specific language, such as a markup language or in another form.

More generally, a flow logic is written according to the canonical data model 257 can represent the following: arguments that are being exchanged in interactions of the applications, the functions that are called to support the interactions, the events (e.g. responses, results, or other events) that can result, any errors that can arise, and states of the applications. In general ad-hoc data models can be used but they may change whenever a new use case is introduced or when an application changes. According to implementations of the present disclosure, the canonical data model 257 can be been defined across a large number of use cases representative of the relevant interactions that can take place in a particular domain (such as IT management or another domain) and across a wide set of applications that can be used to support subsets of the use cases. Thus, in general, a canonical data model can be shared across use cases of a particular domain. A different canonical data model can be used for use cases of another domain. If a use case involves applications in different domains, then a canonical data model can be expanded to support the other domain, or multiple canonical data models may be used.

The information representing interactions between applications and the information representing the states of the applications can be used to track a current state of a workflow (assuming a stateful workflow). The information regarding the errors in the canonical data model 257 can be used for handling errors that arise during execution of the applications. The information regarding the errors can be used to map an error of an application to an error of the workflow that is being performed by the orchestrator 252

By using the canonical data model 257, the development of flow logic that is valid across large sets of applications can be achieved. Sharing a data model across the flow logic can facilitate combining the flow logic and/or customizing the flow logic, and also allows for adapters to be changed or modified to replace applications.

In other implementations, the service exchange 250 does not employ the canonical data model 257, but rather development of the flow logic can be ad-hoc (such as by use of the ad-hoc models) for each use case and/or set of applications.

The application calls issued by the orchestrator 252 can be sent through an interface between the orchestrator 252 and the message broker 254. In this way, the expression of the flow logic does not have to be concerned with specific data models or interfaces employed by the applications, which simplifies the design of the orchestrator 252.

Also, the orchestrator 252 does not have to know specific locations of the applications—the applications can be distributed across multiple different systems in disparate geographic locations. The message broker 254 is responsible for routing the application calls to the respective adapters 256.

Information communicated between the message broker 254 and the adapters 256 is also in an abstract form according to the canonical data model. For example, the message broker 254 can forward an abstract application call from the orchestrator 252 to a respective adapter. Similarly, an adapter can send an event from an application to the message broker in an abstract form according to the canonical data model.

The adapters 256 perform protocol translations between the protocol of the abstract API of the message broker 254, and the protocols to which the interfaces exposed by the corresponding applications are bound. As an example, the protocol of the abstract API of the message broker 254 can be according to a Representational State Transfer (REST) protocol or some other protocol. The protocol of an interface exposed by an application can include Simple Object Access Protocol (SOAP), Remote Procedure Call (RPC), Session Initiation Protocol (SIP), and so forth.

Each adapter 256 can also transform the data model of a message (e.g. message carrying an event) and an abstract API call to the data model and specific API call exposed by a particular application (e.g. instance or release of the particular application). Stated differently, the adapter 256 performs interface adaptation or interface translation by converting the abstract message or abstract API to a message or API call that conforms to the API of the target application. The reverse conversion is performed in the reverse direction, where the message or API call from an application is converted to an abstract message or abstract API call that can be passed through the message broker 254 to the orchestrator 252.

Each adapter 256 can also perform address translation between an address in the address space used by the orchestrator 252 and the message broker 254, and an address in the address space of an application.

As an example, the orchestrator 252 can issue an abstract application call (e.g. a call to a REST API) to a first application. This abstract application call is received by the respective adapter 256, which translates the abstract application call to one or multiple function calls according to the protocol used by application 1, to perform the task(s) requested by the abstract application call made by the orchestrator 252. The adapter 256 also adapts the APIs as noted above. A similar protocol translation and API translation are also performed in the other direction, for a call or event produced by an application. The adapter 256 can convert the message containing the call or event into an abstract message according to the protocol of the message broker 254, and pass the abstract message to the orchestrator 252.

In some cases, an adapter 256 can also emulate a specific behavior. For example, it is possible that an application is unable to generate an event. In this case, the respective adapter 256 can periodically poll the application with an API call to query if an something has occurred with the application, and the adapter 256 can generate (throw) an event on behalf of the application.

In some examples, when an application is replaced by another application with less functionality, the respective adapter 256 can also delegate or orchestrate with another application (or web service) that provides the missing functionality.

The service exchange 250 provides for a multi-point orchestrated integration across multiple applications.

As noted above, content of the service exchange platform including the orchestrator 252, the message broker 254, and the adapters 256 can be changed, such as from an administrator system coupled to the service exchange 250. Applications can be changed, flow logic can be changed, and use cases can be created.

Any given application can be updated or replaced, simply by replacing or modifying the corresponding adapter. For example, if an enterprise wishes to upgrade or replace application 1 in FIG. 1 (with a new application or an updated version of application 1), then the corresponding adapter 256 to which application 1 is coupled can be replaced or updated to support the updated or replaced application. In some cases, replacing the application can involve replacing a first application supplied by a first vendor with a second application supplied by a different vendor. In other cases, replacing the application can involving replacing a first application supplied by a vendor with another application supplied by the same vendor. As yet another example, replacing the application can include upgrading the application to a new release.

Changing a given adapter can involve removing a representation of the adapter (which can be in the form of program code, a markup language file, or some other representation), and replacing the removed representation of the adapter with a new representation of a different adapter. Changing the given adapter can alternatively involve modifying the given adapter or modifying a configuration of the given adapter to support the different application. The changing of the given adapter can be performed by a machine or by program code, either autonomously (such as in response to detection of a replacement of an application) or in response to user input.

Changing an application may also involve moving an instance of the application from one instance to another instance, or from one location to another location. The respective adapter can be updated or configuration of the adapter is changed (the adapter itself remains unchanged), to refer to another application instance or to an instance of the application at another location.

When changing an application to a new or updated application, it may be possible that certain functionality of the previous application is no longer available from the new or updated application. In this case, the respective adapter can delegate or orchestrate with another application (or web service) that provides the missing functionality. Alternatively, the workflow can be modified to take into account the loss of functionality in the use case.

Also if new functionality is provided by new or upgraded application, the workflow can be modified to use the new functionality.

In accordance with some implementations, a workflow can be modified relatively easily by changing the respective flow logic with a different flow logic (a modified version of the flow logic or a new flow logic). The different flow logic can then be loaded onto the orchestrator 252 to implement the modified workflow. By using the service exchange 250, workflows can be easily customizable by providing new or modified flow logic to the orchestrator 252. Nothing else has to be changed unless a new use case specifies use of new calls and data not covered in current adapters (e.g. an adapter is able to call just a subset of APIs of the application) or the canonical model. In this latter case, the canonical data model can be updated and adapters can be updated to be able to make the calls, or new adapters can be provided.

New use cases can also be created, and corresponding flow logic and adapters can be provided. In addition, the canonical data model may be updated accordingly.

The content changes noted above can be performed using any of various tools, such as a Software Development Kit (SDk) tool or other type of tool used to create applications and other program code. A content pack can be updated using the tool, and the modified content pack can be loaded using an administration system. The administration system can configure the adapters to point to the correct instance of an application. A new use case and respective content can be also created with a SDk tool. Note also that when the canonical data model 257 is updated, the canonical data model 257 remains backwards compatible with content packs of existing use cases.

Figure 4:
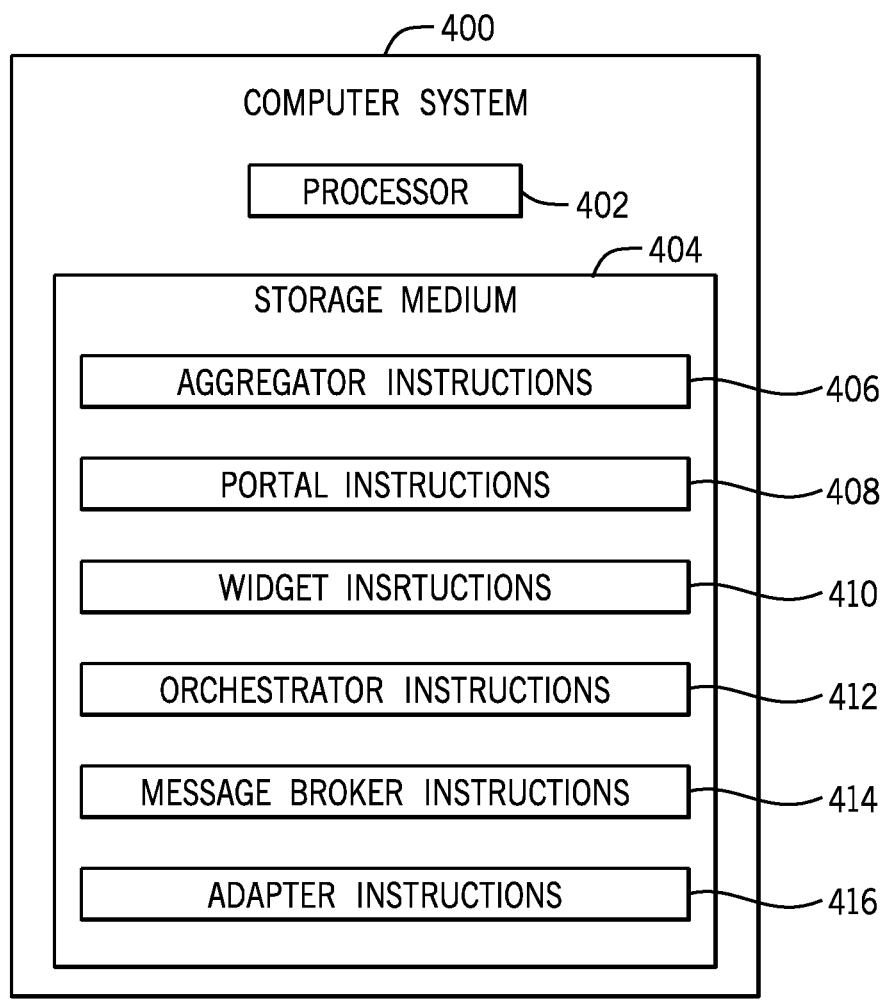
FIG. 4 is a block diagram of a computer system according to some implementations.

FIG. 4 is a block diagram of an example computer system 400 according to some implementations, which can be used to implement the service broker 200 or service exchange 250 according to some implementations. The computer system 400 can include one computer or multiple computers coupled over a network. The computer system 400 includes a processor (or multiple processors) 402. A processor can include a microprocessor, a microcontroller, a physical processor module or subsystem, a programmable integrated circuit, a programmable gate array, or another physical control or computing device.

The processor(s) 402 can be coupled to a non-transitory machine-readable or computer-readable storage medium 404, which can store various machine-executable instructions. The machine-executable instructions can include aggregator instructions 406 to implement the aggregator 104, portal instructions 408 to implement the portal 112, widget instructions 410 to implement the widgets 204, 206, and 210, orchestrator instructions 412 to implement the orchestrator 252, message broker instructions 414 to implement the message broker 254, and adapter instructions 416 to implement the adapters 256.

The storage medium (or storage media) 504 can include one or multiple forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
aggregating, by a system including a hardware processor, catalogs, that describe respective services for fulfillment by respective applications, to form an aggregate catalog;
receiving, by the system, a request relating to a first service of the respective services based on content presented from the aggregate catalog;
in response to the request, performing an orchestrated execution, by the system, of an end-to-end process to fulfill the request relating to the first service, the orchestrated execution of the end-to-end process comprising calling at least one application of the respective applications that performs the first service;
updating the aggregate catalog; and
in response to the updating of the aggregate catalog, synchronizing the update of the aggregate catalog with a first catalog of the catalogs by updating the first catalog to reflect the update of the aggregate catalog;
wherein the aggregate catalog comprises metadata including a constraint that identifies the at least one application to be called for performance of the first service; and
wherein the calling of the at least one application is based on the constraint included in the metadata of the aggregate catalog.

2. The method of claim 1, wherein the orchestrated execution of the end-to-end process is performed by a service exchange and comprises:
calling, by an orchestrator in the service exchange, the at least one application that performs the first service;
reacting, by the orchestrator to an event from the at least one application; and
communicating information between the orchestrator and the at least one application using a message broker of the service exchange.

3. The method of claim 1, wherein the system is provided by an enterprise, and wherein the aggregating of the catalogs comprises aggregating, into the aggregate catalog, the catalogs that comprise a catalog of a third party vendor of the enterprise.

4. The method of claim 1, further comprising:
performing, by the system, the end-to-end process using the at least one application that is un-modified for the aggregate catalog.

5. The method of claim 1, further comprising:
providing, by the system, widgets comprising at least one from among a widget to search information of a knowledge base, a widget to create a new service, a widget to perform an approval for a request of a service, a lifecycle management widget, a support ticket management widget, a widget to select or fill information, or a widget to determine access visibility.

6. The method of claim 5, further comprising:
implementing the widgets as microservices;
using tools to author the microservices for a service broker according to an agile and reusable model, the service broker performing the aggregating and the receiving; and
providing a platform including the microservices.

7. The method of claim 1, wherein the aggregating is performed by an aggregator executed in the system, the method further comprising:
  creating, using the aggregator, a new service based on the respective services of the catalogs; and
  associating the new service with a second application of the respective applications, the second application for fulfilling the new service.

8. The method of claim 1, further comprising:
  determining, by the system, entities with permission to view selected services of the aggregate catalog.

9. The method of claim 1, further comprising:
  performing a lifecycle management for an order of the request relating to the first service.

10. The method of claim 1, wherein the aggregating is performed by an aggregator, and the receiving is performed by a portal, and wherein the aggregator and portal are part of a service broker, the service broker comprising a service broker deployed at a customer site, deployed in a cloud, deployed using Software as a Service (SaaS) services, deployed at a site of an enterprise, or deployed in a cloud and at a site of an enterprise.

11. The method of claim 1, wherein the aggregating is performed by an aggregator executed in the system, wherein the synchronizing is performed using an application programming interface (API), the method further comprising:
  synchronizing, using the API, a new service or a modified service of a second catalog of the catalogs with the aggregate catalog.

12. A system comprising:
  a processor; and
  a non-transitory storage medium storing instructions executable on the processor to:
  aggregate catalogs, that describe respective services for fulfillment by respective applications, to form an aggregate catalog;
  synchronize content of the catalogs and the aggregate catalog in response to an update of any of the catalogs and the aggregate catalog, wherein the synchronizing of the content of the catalogs and the aggregate catalog comprises:
    in response to updating the aggregate catalog, synchronizing the update of the aggregate catalog with a first catalog of the catalogs by updating the first catalog to reflect the update of the aggregate catalog;
  receive a request relating to a first service of the respective services based on content presented from the aggregate catalog; and
  in response to the request, perform an orchestrated execution of an end-to-end process to fulfill the request relating to the first service, the orchestrated execution of the end-to-end process comprising calling at least one application of the respective applications, the called at least one application to perform the first service,
  wherein the aggregate catalog comprises metadata including a constraint that identifies the at least one application to be called for performance of the first service, and
  wherein the calling of the at least one application is based on the constraint included in the metadata of the aggregate catalog.

13. The system of claim 12, further comprising:
  a portal to present a user interface containing information of the respective services based on the aggregate catalog,
  wherein the request is responsive to a selection of the first service made in the user interface.

14. The system of claim 12, wherein the catalogs comprise catalogs of multiple vendors.

15. An article comprising at least one non-transitory machine-readable storage medium storing instructions that upon execution cause a system to:
  aggregate catalogs, that describe respective cloud services for fulfillment by respective applications, to form an aggregate catalog;
  synchronize content of the catalogs and the aggregate catalog in response to an update of any of the catalogs and the aggregate catalog, wherein the synchronizing of the content of the catalogs and the aggregate catalog comprises:
    in response to updating the aggregate catalog, synchronizing the update of the aggregate catalog with a first catalog of the catalogs by updating the first catalog to reflect the update of the aggregate catalog;
  receive a request relating to a first cloud service of the respective cloud services based on content presented from the aggregate catalog; and
  in response to the request, perform an orchestrated execution of an end-to-end process to fulfill the request relating to the first cloud service, the orchestrated execution of the end-to-end process comprising calling at least one application of the respective applications, the called at least one application to perform the first cloud service,
  wherein the aggregate catalog comprises metadata including a constraint that identifies the at least one application to be called to perform the first cloud service, and
  wherein the calling of the at least one application is based on the constraint included in the metadata of the aggregate catalog.

16. The article of claim 15, wherein the instructions upon execution cause the system to further:
  in response to the request, invoke widgets comprising at least one from among a widget to search information of a knowledge base, a widget to create a new service or a new term of an existing service, a widget to perform an approval for a request of a service, a lifecycle management widget, a support ticket management widget, a widget to select or fill information, or a widget to determine access visibility.

17. The article of claim 15, wherein the instructions upon execution cause the system to further:
  in response to the request, call a trigger in the aggregate catalog; and
  pass the call to a service exchange to trigger execution of the end-to-end process.

18. The article of claim 15, wherein the synchronizing of the update of the aggregate catalog with the first catalog is performed using an application programming interface (API), the instructions upon execution causing the system to further:
  synchronize, using the API, a new service or a modified service of a second catalog of the catalogs with the aggregate catalog.

* * * * *